(12) United States Patent
Mekid

(10) Patent No.: US 7,911,614 B1
(45) Date of Patent: Mar. 22, 2011

(54) NON-CONTACT MEASUREMENT PROBE

(75) Inventor: Samir Mekid, Dhahran (SA)

(73) Assignee: King Fahd University of Petroleum and Minerals, Dharan (SA)

( * ) Notice: Subject to any disclaimer, the term of this patent is extended or adjusted under 35 U.S.C. 154(b) by 0 days.

(21) Appl. No.: 12/591,119

(22) Filed: Nov. 9, 2009

(51) Int. Cl.
*G01P 3/36* (2006.01)
*G01P 3/40* (2006.01)

(52) U.S. Cl. .................... 356/435; 356/28.5; 250/231.13

(58) Field of Classification Search .................. 356/28.5, 356/496, 218, 318, 432–444; 250/231.1–231.13
See application file for complete search history.

(56) References Cited

U.S. PATENT DOCUMENTS

| | | | |
|---|---|---|---|
| 4,390,278 A | | 6/1983 | Inoue |
| 4,506,979 A | * | 3/1985 | Rogers ........................ 356/28.5 |
| 4,561,333 A | | 12/1985 | Kohno et al. |
| 4,906,092 A | * | 3/1990 | O'Meara ..................... 356/28.5 |
| 5,467,192 A | | 11/1995 | Manning |
| 6,075,604 A | | 6/2000 | Crawforth et al. |
| 6,528,762 B2 | | 3/2003 | Mayer |
| 6,539,642 B1 | | 4/2003 | Moriyasu et al. |
| 6,723,953 B2 | | 4/2004 | Aleshin |
| 7,049,578 B2 | * | 5/2006 | Wada et al. .............. 250/231.13 |

FOREIGN PATENT DOCUMENTS

| | | |
|---|---|---|
| DE | 4203284 A1 | 8/1993 |
| JP | 2184713 A | 7/1990 |
| JP | 4105780 A | 4/1992 |
| JP | 2003232616 A | 8/2003 |
| JP | 2004058242 A | 2/2004 |

OTHER PUBLICATIONS

Mekid, S. and Vacharanukul, K., "Differential Laser Doppler based Non-Contact Sensor for Dimensional Inspection with Error Propagation Evaluation," Senors 6(6), pp. 546-556, Jun. 2006.

* cited by examiner

*Primary Examiner* — Sang Nguyen
(74) *Attorney, Agent, or Firm* — Richard C. Litman

(57) ABSTRACT

The non-contact measurement probe is capable of dimensional measurement of a workpiece while it is being machined, and reporting dynamic error for real-time compensation by the machining tool. Measurement includes diameter and roundness of the workpiece. The measurements are automatically fed back to a machine controller for intelligent error compensation. Based on known laser Doppler techniques and real time data acquisition, the probe delivers dimensional accuracy at few microns over a range of 100 mm. The measurement probe employs a differential laser-Doppler arrangement, allowing acquisition of information from the workpiece surface. Moreover, the measurements are traceable to standards of frequency allowing higher precision.

9 Claims, 3 Drawing Sheets

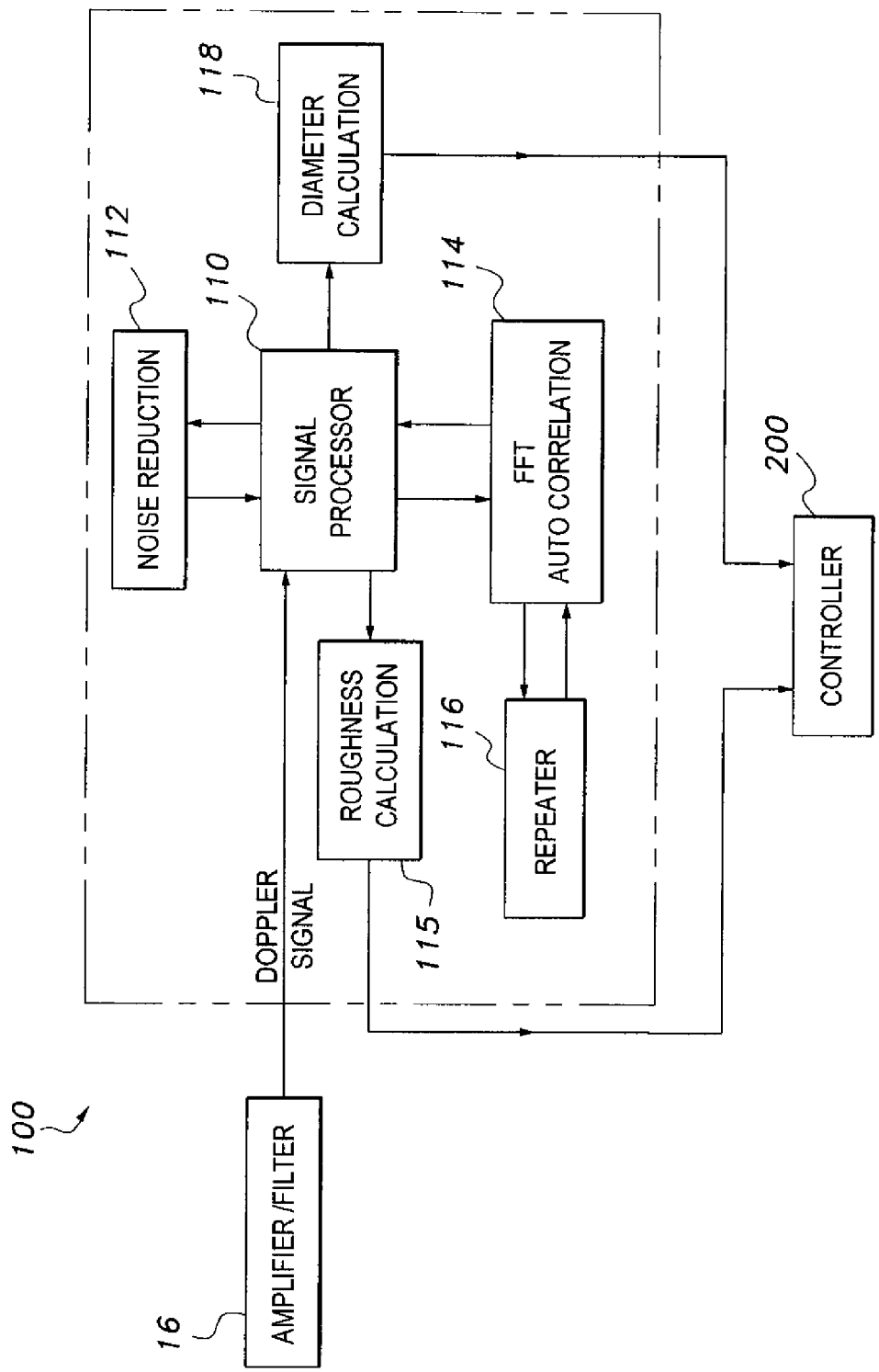

NON-CONTACT MEASUREMENT PROBE

BACKGROUND OF THE INVENTION

1. Field of the Invention

The present invention relates generally to measurement tools, and particularly to a non-contact measurement probe that measures the diameter and roundness of a workpiece while being machined in a computer numerical controlled (CNC) machine.

2. Description of the Related Art

Zero defect parts can only be obtained via full automatic error compensation while they are being machined on the next generation of intelligent machining processes to ensure high quality products at low price in a short period of time. Off-line axis error compensation is successfully achieved with NC machines including thermal sensors, while on-line compensation still has some difficulties, mainly with probes, hardware, and controllers. Quality control of manufactured parts is traditionally performed using manual inspection methods and statistical sampling procedures. It has the disadvantages of releasing some defective parts and requiring an inspection area. To overcome these problems, in-process inspection with error correction in NC machines is proposed as another alternative.

In-process measurement techniques have been proposed over the last two decades to control the quality of a workpiece, with some difficulties to be addressed. The principal trend in this type of inspection is to use a measuring probe with a measurement control system and to adjust machining parameters to reach the nominal dimension with the required accuracy. Optical measurement techniques have the advantage of being fast and non-contact.

A variety of optical sensors are applied to measurement in metrology. The most common techniques include triangulation, shearing interference, coherence radar, and laser Doppler techniques. Laser Doppler Velocimetry has proven to be very accurate and repeatable for many years for fluid applications, such as anemometry. Also, laser Doppler systems find application in length measurement of sheet materials (e.g., paper, textiles and foils). Recently, an indirect measurement method for the determination of surface velocity in vibrating structures based on laser-Doppler vibrometry has been investigated.

In mass production, diameter is one of the significant parameters to be inspected. Many measurement techniques have been developed to measure the diameter of a workpiece. It would be desirable to have an in-process laser-Doppler technique that could measure the diameter of a moving workpiece.

Thus, a non-contact measurement probe solving the aforementioned problems is desired.

SUMMARY OF THE INVENTION

The non-contact measurement probe inspects the diameter and the roundness of a rotating workpiece while the workpiece is being machined on a CNC machine. The measurement probe (sensor) includes a laser head, optics, and a light sensing system. The sensor is portable and provides a BNC coaxial cable to interface with a data acquisition system.

These and other features of the present invention will become readily apparent upon further review of the following specification and drawings.

BRIEF DESCRIPTION OF THE DRAWINGS

FIG. 3 is a block diagram showing system components of the non-contact measurement probe according to the present invention.

Similar reference characters denote corresponding features consistently throughout the attached drawings.

DETAILED DESCRIPTION OF THE PREFERRED EMBODIMENTS

Figure 1:
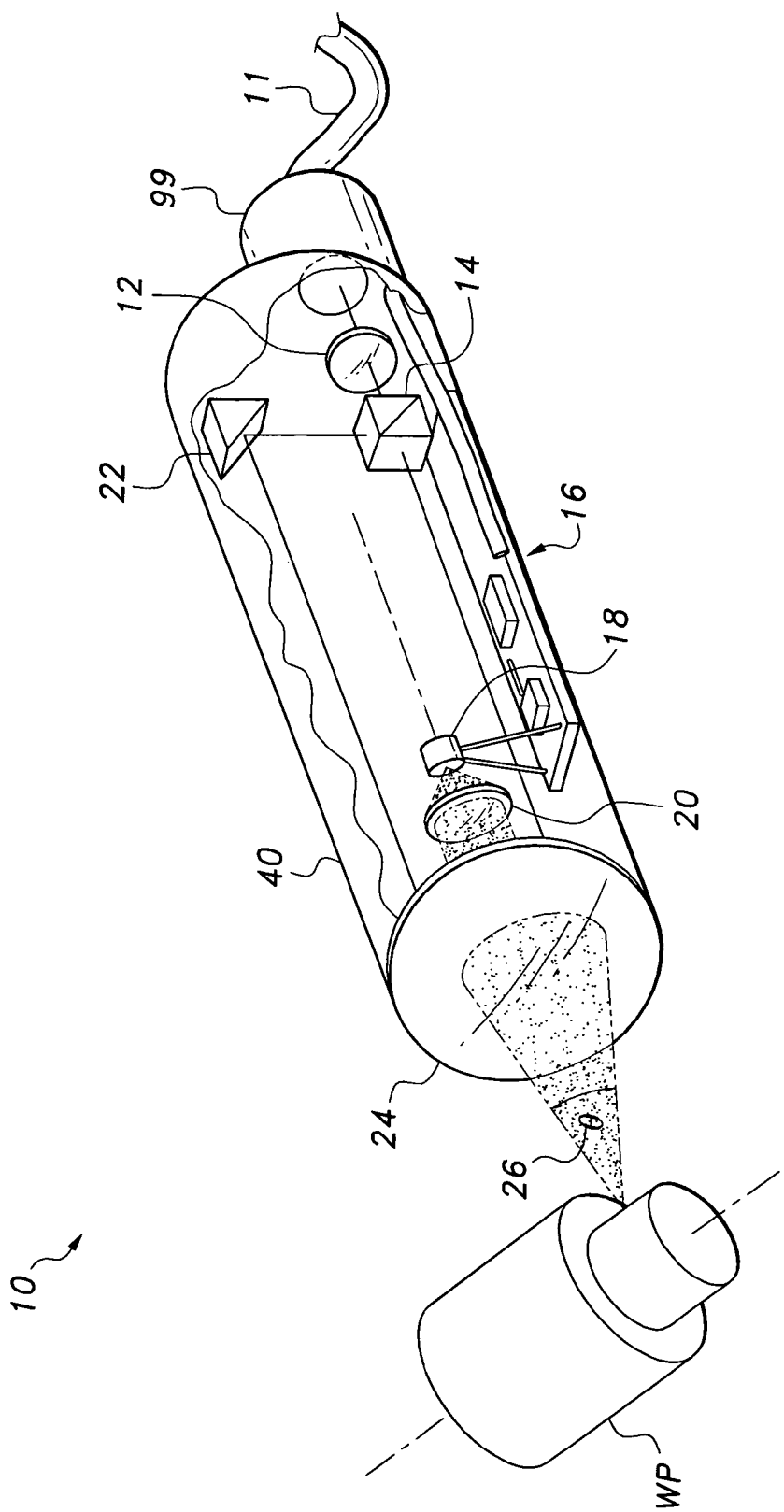
FIG. 1 is a diagrammatic perspective view of a non-contact measurement probe according to the present invention.
Figure 2:
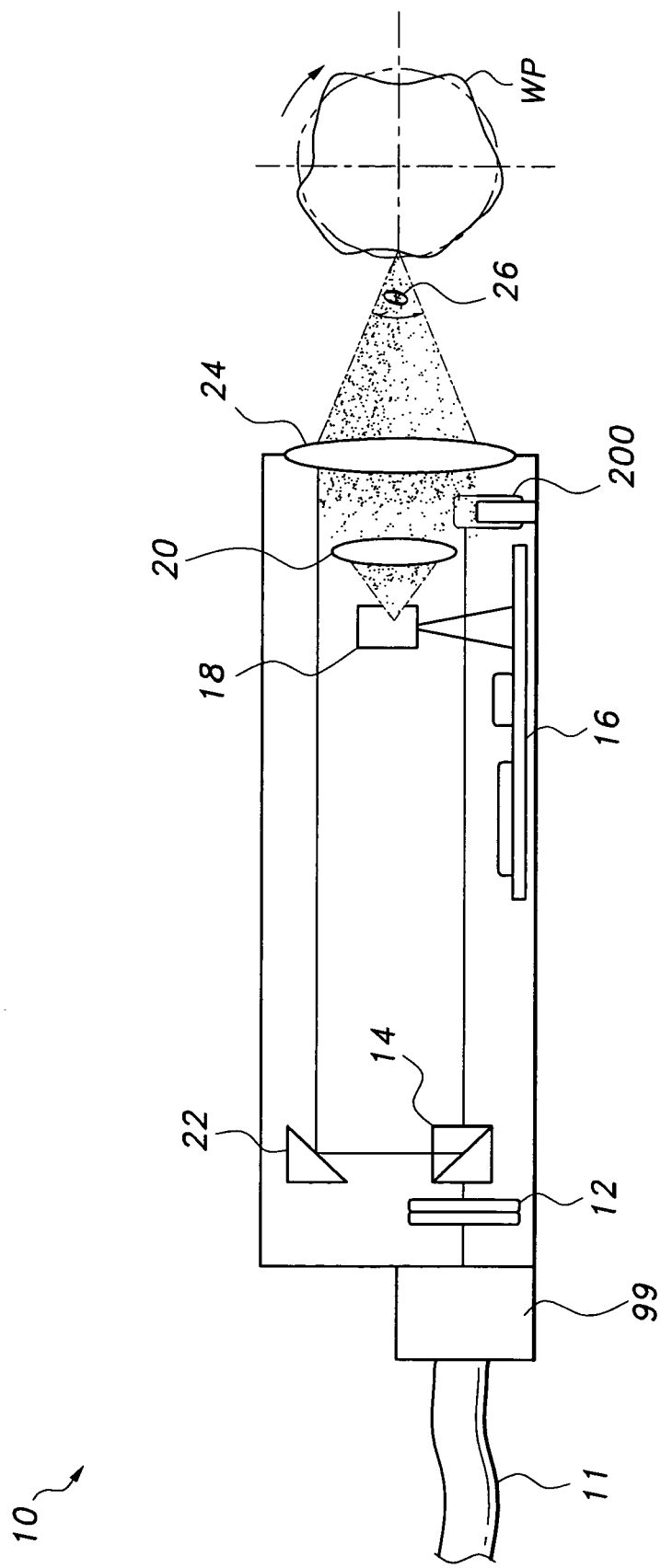
FIG. 2 is a schematic side view of a non-contact measurement probe according to the present invention, shown measuring a workpiece having an irregular profile.

As shown in FIGS. 1 and 2, the non-contact measurement probe 10 is positioned proximate a rotating workpiece WP to facilitate inspection of the diameter and roundness of the rotating workpiece WP while the workpiece is being machined on a CNC machine. The measurement probe 10 functions as a sensor, and includes a laser head 99, a main lens 24 and a light sensing system 18. The probe 10 is portable and includes a BNC coaxial cable (not shown) that interfaces with a data acquisition system 100, as shown in FIG. 3. The data acquisition system could be any program (or software) designed to collect data through a high-speed data acquisition card (usually called scope card). The signal is then transformed from analog to digital and stored in memory.

A Fast Fourier Transformation is applied to the stored data to estimate the required dominant frequency needed to estimate the diameter of the workpiece WP. Several readings are made at high speed to average the current value of the workpiece diameter.

The probe 10 is used in CNC machining with a real-time error compensation algorithm programmed in the CNC machine tool controller 200. The probe 10 continually measures the actual diameter of the rotating workpiece WP being machined and provides the controller 200 with the current diameter. The NC controller will correct the next tool path via error compensation and hence produce a more precise workpiece in terms of diameter. A similar procedure is applied when the surface roundness has to be checked.

The measurement probe 10 could be extended to an instrument (non-contact probe) that is portable and could be used to measure stationary components for quality inspection. Data acquisition systems for such a probe 10 are well known to those of ordinary skill in the art.

Details of an exemplary data acquisition system that could be used by probe 10 are included in U.S. Pat. No. 6,539,642, issued to Moriyasu, et al. on Apr. 1, 2003, which is incorporated by reference in its entirety herein. The fundamental differential Doppler technique of the measurement probe 10 is employed for solid material, the emitted light from laser head 99 being kept clear of background lighting by polarizer and retarder 12, thereby directing the emitted light towards the lens 24, and thence to the workpiece WP. The reflected, scattered light is received back through the lens 20, which focuses the reflected light on the photosensor 18.

As shown in FIG. 3, the Doppler signal is acquired in real time and processed by signal processor 110 for noise reduction (at 112) and Fast Fourier Transform (FFT) autocorrelation (at 114) to accurately determine the Doppler frequency, and hence, the workpiece diameter (at 118). It is expected to enhance the accuracy of measurement up to very few micrometers over a range of 100 mm, with a very good traceability of measurements because laser light is the core probe component. The laser based probe 10 measures the diameter of a rotating workpiece WP without any contact of the probe 10 on the surface of the workpiece WP.

The currently designed probe 10 can measure a diameter up to 100 mm with a resolution of 0.5 μm and an accuracy of about 10 μm over the range of measurement. The accuracy is much better (i.e., 3 μm) over a short range of measurement (i.e., up to 40 mm). Over the range of diameter of 100 mm, the resolution of the roundness is 0.02 μm and an accuracy of about 1 μm over the same range of diameter.

Technical details of the Doppler frequency workpiece measurement procedure are discussed in a research paper entitled "Differential Laser Doppler based Non-Contact Sensor for Dimensional Inspection with Error Propagation Evaluation," published in Sensors, 2006, #6, pages 546 to 556, Samir Mekid (the present inventor) and Ketsaya Vacharanukul, which is incorporated by reference in its entirety herein.

The probe includes a fiber optic cable 11 extending from a hollow, tubular housing 40 that is connected to an external power source (not shown), which powers the probe 10. A main lens 24 is disposed at the front portion of the housing 40 and may also include polarizing and/or retarding optics 12. The polarizing-retarding optics 12 are disposed at a rear portion of the housing between the laser head 99 and a beam splitter cube 14. The beam splitter in the housing 40 is utilized to split the laser beam inside the housing 40, the split beam facilitating Doppler measurements on workpiece WP. A right angle mirror 22 distributes the split beam to separated targets.

A collecting lens 20 redirects and focuses a portion of light arriving through the front main lens 99 onto photo diode 18, which collects the redirected light and outputs a signal to electronic amplification and signal filtering circuit 16. The amplification and signal filtering circuit 16 has an output that is sent to the aforementioned data acquisition circuitry 100. A beam stopper 200 is disposed in front of a circuit board of the amplification and signal filtering circuit 16. During operation, the laser light incident to workpiece WP and the reflected light from the workpiece WP subtend a crossing angle 26. The information is fed to the data acquisition and signal processing equipment, from which roundness of the workpiece WP is compared to a least squared circle approximation of the ideal roundness for the workpiece WP (via the roughness calculation at 115). Further, a circuit for repeating the Fast Fourier Transform autocorrelation at high speed 116 is provided, thereby obtaining an average current value of the workpiece diameter (at 118).

Once implemented in a CNC machine, the probe 10 will inform the machine controller about the current diameter and roundness as part of the quality check before the final pass. This will secure a product that is machined to the right diameter and appropriate roundness. The probe 10 will help reduce wastage in industry. Moreover, the manufacturing time will be reduced because the inspection is done at the same time as machining. Hence, there is no need to remove the workpiece WP to do the inspection. Applications are found mainly in manufacturing of rotated workpieces for all domains, as well as quality inspection offices.

It is to be understood that the present invention is not limited to the embodiment described above, but encompasses any and all embodiments within the scope of the following claims.

I claim:

1. A non-contact measurement probe, comprising:
    a hollow, tubular housing;
    a laser head disposed in a rear portion of the housing;
    a fiber optic cable extending from the laser head, the fiber optic cable delivering source lighting to the laser head;
    a beam splitter cube mounted in front of the laser head, amplified coherent light transmitted from the laser head being split into a first horizontal beam and a vertical beam;
    a right angle mirror disposed above the beam splitter cube, the right angle mirror redirecting the vertical light beam into a second horizontal beam above parallel to the first horizontal beam, the first and second horizontal beams extending along a longitudinal axis of the tubular housing;
    a main lens forming a front end of the tubular housing, the second horizontal beam being refracted by the main lens as the second beam exits the housing through the main lens in order strike a workpiece so that a combination of the refracted second horizontal beam and light of the refracted second beam being reflected off of the workpiece form a cone of light having a crossing angle, a portion of the light cone traversing back inside the housing through the main lens;
    a collecting lens in the housing disposed behind the main lens, the collecting lens focusing the portion of the light cone entering the housing;
    an electronic photoreceptor positioned behind the collecting lens, the electronic photoreceptor receiving focused light from the collecting lens, the electronic photoreceptor transmitting an output signal responsive to the received focused light;
    an amplifier-filter combination processing the photoreceptor output signal;
    a signal processor in operable communication with the amplifier-filter combination, the signal processor being configured to perform a differential Doppler analysis based on the transmitted and reflected laser light received by the electronic photoreceptor, thereby determining roundness of the workpiece based on the cone of light reflected by the workpiece; and
    a beam stopper disposed in a front portion of said probe housing, wherein the beam stopper attenuates the first horizontal beam.

2. The non-contact measurement probe according to claim 1, wherein said signal processor includes a circuit for determining a diameter of the workpiece.

3. The non-contact measurement probe according to claim 2, wherein said signal processor circuit comprises:
    means for acquiring the differential Doppler signal in real-time; and
    means for performing a Fast Fourier Transform autocorrelation, thereby accurately determining a frequency of the differential Doppler signal, resulting in an accurate calculation of the diameter of the workpiece.

4. The non-contact measurement probe according to claim 3, further comprising a circuit for repeating the Fast Fourier Transform autocorrelation at high speed, thereby obtaining an average current value of the workpiece diameter.

5. The non-contact measurement probe according to claim 3, wherein said signal processing circuitry includes means for determining a roughness property of the workpiece.

6. The non-contact measurement probe according to claim 1, wherein the measurement probe is portable.

7. The non-contact measurement probe according to claim 1, further comprising electronic circuitry in the probe forming a portion of a feedback control loop adapted for use by a CNC machine having real-time error compensation, the probe continually measuring the actual diameter of a rotating workpiece being machined and providing a controller of the CNC machine with the current diameter, the NC controller correcting the next tool path of the CNC machine via the error compensation.

8. The non-contact measurement probe according to claim 1, further comprising polarizing-retarding optics disposed at a rear portion of the housing between said laser head and said beam splitter cube.

9. The non-contact measurement probe according to claim 1, wherein the signal processor is a portable computer executing program instructions enabling the computer to determine diameter and roundness and communicate said diameter and roundness information to a machine controller.

* * * * *